(12) United States Patent
Griep et al.

(10) Patent No.: US 7,092,694 B2
(45) Date of Patent: Aug. 15, 2006

(54) WIRELESS COMMUNICATION SYSTEM HAVING A GUEST TRANSMITTER AND A HOST RECEIVER

(75) Inventors: Pieter Dingenis Griep, Leuven (BE); Marc Emiel Celine Lambrechts, Kessel-Lo (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 446 days.

(21) Appl. No.: 10/175,413

(22) Filed: Jun. 19, 2002

(65) Prior Publication Data

US 2003/0069012 A1   Apr. 10, 2003

(30) Foreign Application Priority Data

Jun. 19, 2001   (EP) .................... 01202373

(51) Int. Cl.
*H04M 11/00* (2006.01)
*H04Q 7/20* (2006.01)

(52) U.S. Cl. ............. 455/403; 455/435.1; 455/435.2; 455/435.3

(58) Field of Classification Search ............. 455/426.1, 455/426.2, 435.2, 435.1, 462, 463, 403
See application file for complete search history.

(56) References Cited

U.S. PATENT DOCUMENTS

| 5,276,905 | A | * | 1/1994 | Hurst et al. ............... 455/435.2 |
| 5,592,533 | A | * | 1/1997 | McHenry et al. .......... 455/435.2 |
| 5,640,756 | A | * | 6/1997 | Brown et al. .................. 29/701 |
| 6,035,193 | A | * | 3/2000 | Buhrmann et al. ....... 455/426.1 |
| 6,148,205 | A | * | 11/2000 | Cotton ....................... 455/435.1 |
| 2004/0097189 | A1 | * | 5/2004 | Bongfeldt et al. .............. 455/7 |

FOREIGN PATENT DOCUMENTS

WO   WO9725820   7/1997

\* cited by examiner

*Primary Examiner*—Lester G. Kincaid
*Assistant Examiner*—Fred A. Casca

(57) ABSTRACT

A system including at least one host and at least one guest communicating with each other via a wireless medium and having structure for linking a selected host (10) to a selected guest (20). In order to be able to perform such selection and such linking in a simplified manner, the host (10) has structure for establishing the link on the double condition that the guest (20) transmits a declaration signal (50) and that this declaration signal (50) is transmitted from within a declaration area (40) of the host (10) which differs substantially from the normal operating area (60) of the guest/host pair. The selection and the linking of the host (10) and the guest (20) is performed simply by putting the selected guest (20) within the declaration area (40) of the selected host (10) and by triggering the transmission of a declaration signal (50) by the selected guest (20) from within this declaration area (40).

15 Claims, 4 Drawing Sheets ered to the host. That is why, in this particular case, the declaration area of the host encompasses all the normal operating area of the host.

WIRELESS COMMUNICATION SYSTEM HAVING A GUEST TRANSMITTER AND A HOST RECEIVER

DESCRIPTION OF PRIOR ART

The invention relates to a wireless communication system comprising at least one guest having means including a guest transmitter for transmitting guest signals and at least one host having means including a host receiver for receiving the guest signals, said host comprising means for establishing a link with the guest upon reception of a declaration signal transmitted by the guest, after which the host will respond to regular operation signals transmitted by the linked guest.

Such a wireless communication system is known from PCT Patent application number WO94/10785 which describes a process for linking a base station (a host) with a mobile station (a guest) in the framework of the DECT standard (Digital Enhanced Cordless Telephone).

In a declaration phase of such a known process, the following steps must be performed in order to establish a link between a host and a guest. Firstly, a user has to perform a first selection consisting in selecting which host among the plurality of hosts of the system a guest is to be linked to. Upon such first selection, which is often performed by pushing a particular button of the selected host, the selected host transmits a announcement signal for the attention of the guests. Secondly, the user has to perform a second selection by selecting to which guest among the plurality of guests of the system the selected host is to be linked. Upon such second selection, which is often performed by pushing a particular button (combination) of the selected guest, the selected guest transmits a response to the announcement signal in the form of a declaration signal for the attention of the selected host.

Upon reception of the declaration signal by the selected host, further transactions between the selected host and the selected guest take place, which finally result in the selected host and the selected guest being linked together.

The purpose of this linking process is to make sure that a host does not respond to just any guest. Indeed, subsequent to the linking process, the selected host will respond to regular operation signals transmitted by the linked guests and will not respond to regular operation signals transmitted by non-linked guests.

Although such a known process works well in many circumstances, there is a wish to provide a system with a simplified linking process, as well as a simplified system.

SUMMARY OF THE INVENTION

It is an object of the invention to provide a simplified wireless communication system with a simplified linking process between a host and a guest.

To this end, the wireless communication system in accordance with the invention is characterized in that the system comprises means for establishing the link with the guest upon reception by the host of the declaration signal transmitted by the guest while the guest transmitter is located within a declaration area of the host, said declaration area being an area substantially different from a normal operating area of the guest/host pair, and said means not establishing the link with the guest upon transmission of the declaration signal by the guest while the guest transmitter is located outside said declaration area.

In such a system, the user first brings the guest's guest transmitter into the declaration area of the host, said declaration area being different from the normal operating area of said host. The user thereby indirectly selects said host. The user then performs an action on the guest, for example, by pressing a particular button on said guest, thereby selecting said guest. After said action, the selected guest transmits a declaration signal for the attention of the hosts. Upon reception of this signal, the selected host establishes the link with the selected guest. If the selected guest transmits this signal from outside the host's declaration area, the host either does not accept this signal or does not detect this signal and consequently does not establish the link with the selected guest.

Thanks to the characteristics of the system according to the invention, the selection of the host, the selection of the guest, and the linking of the selected host with the selected guest can thus be performed simultaneously by a single user action, thereby simplifying the linking process.

Moreover, a system according to the invention does not require a direct user action on the host in order to select said host. This additional advantage may be used in cases where a direct action on the host is not desirable and/or not possible.

In a preferred embodiment, the system according to the invention is such that the declaration area of the host extends around the host receiver and is substantially smaller than and is included in the normal operating area of the guest transmitter/host receiver pair. A single host receiver thus suffices for handling both declaration signals and regular operating signals, thereby simplifying the system.

In a preferred embodiment of the invention, a radius of the declaration area of the host does not exceed 10% of the radius of the normal operating area of the guest transmitter/host receiver pair, said radius being measured from the host receiver. This provides for simple distinction between both areas, thereby further simplifying the required circuitry.

In particular embodiments of the invention, the host also comprises means for breaking up the link with the guest upon reception of an unlinking signal transmitted by the guest while the guest transmitter is located in the declaration area of the host, said means not breaking up the link with the guest upon transmission of the unlinking signal by the guest while the guest transmitter is located outside said declaration area. This provides for a simple solution to the reverse problem of unlinking a selected guest from a selected host.

These and other aspects of the invention are apparent from and will be elucidated with reference to the embodiments described hereafter.

BRIEF DESCRIPTION OF THE DRAWINGS

In the drawings.

The figures are not drawn to scale. Generally speaking, identical components are denoted by the same reference numerals in the figures.

DETAILED DESCRIPTION OF PREFERRED EMBODIMENTS

Figure 1:
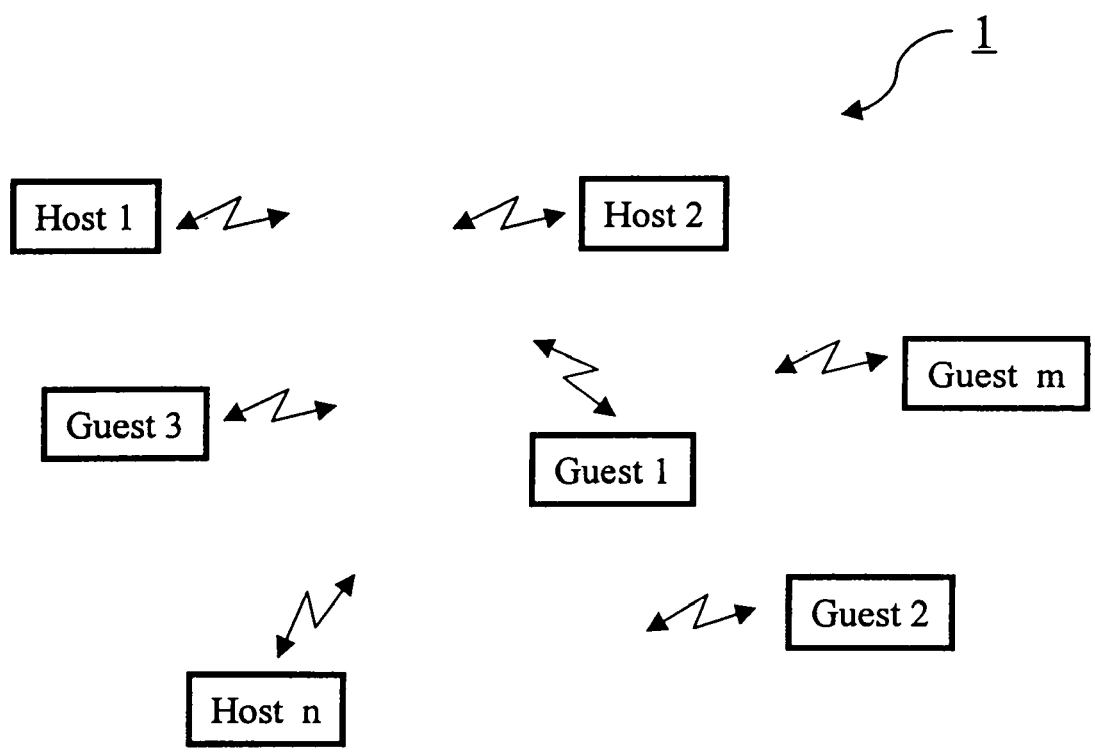
FIG. 1 shows schematically a wireless communication system.

FIG. 1 shows schematically a general wireless communication system (1) comprising at least one host and at least one guest. Guests and hosts communicate with each other by transmitting and receiving signals via a wireless medium.

Figure 2:
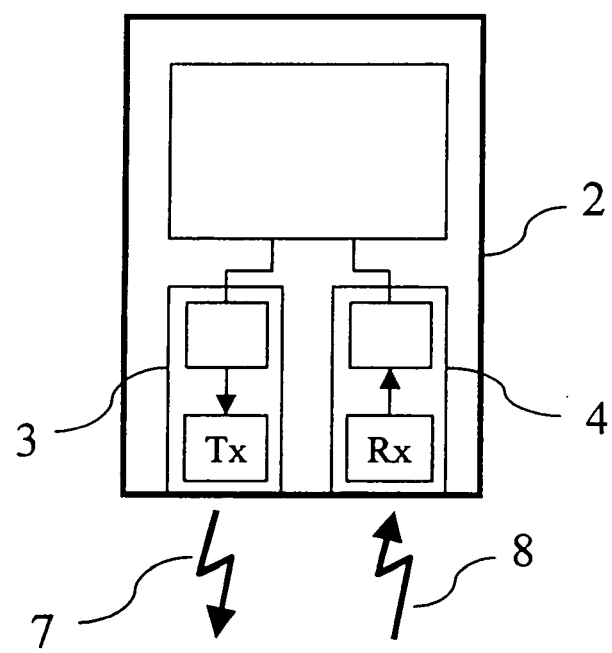
FIG. 2 shows schematically an element of the wireless communication system of FIG. 1.

FIG. 2 shows schematically an element (2) of the wireless communication system (1) of FIG. 1. Such an element (2) is either a host or a guest and comprises means for transmitting signals which include a transmitter (3), and/or means for receiving signals which include a receiver (4). A transmitted signal (7) is represented by an arrow originating from the transmitter (3) and a received signal (8) is represented by an arrow pointing towards the receiver (4).

In order for a first element to validly receive a signal from a second element, the receiver of the first element and the transmitter of the second element must be within a given distance of reach from each other, a quantity which is quite usual with wireless communication systems. The various distances of reach between said elements define the normal operating area of the first element/second element pair.

Since these signals propagate via a wireless medium, any first element within the distance of reach (or—in other terms—within the normal operating area) of a second element will validly receive signals transmitted by the second element and may thus respond to such signals. This is not always desired. In a multiple guest/multiple host environment, for example, it is often required that a host responds only to signals originating from certain guests and not to signals originating from other guests, even if said other guests transmit signals from within the normal operating area of the host.

To achieve this selectivity, one known method consists in establishing a link between a host and a guest and having the host respond only to signals received from linked guests.

Such a known method is described in PCT Patent Application number WO94/10785. This known method comprises two stages. The first is a request stage (also called declaration stage) which is triggered by a user action consisting generally in pushing a particular button on the host, after which the host transmits a request signal to all guests. By performing said action, the user in fact selects precisely which host he wishes to prepare for linking. The user then performs a second action for selecting which guest he wishes to link to the selected host. This second action consists generally in pushing a particular button or combination of buttons on the selected guest. Upon such second action, the selected guest responds to the request signal from the selected host. Such a response could be called a declaration signal. Upon reception of said response, the selected host enters into a second stage for registering the selected host, thereby linking the selected host to the selected guest.

In a wireless communication system according to present invention, this selection and linking is simplified for the user, as will be illustrated hereafter.

Figure 3:
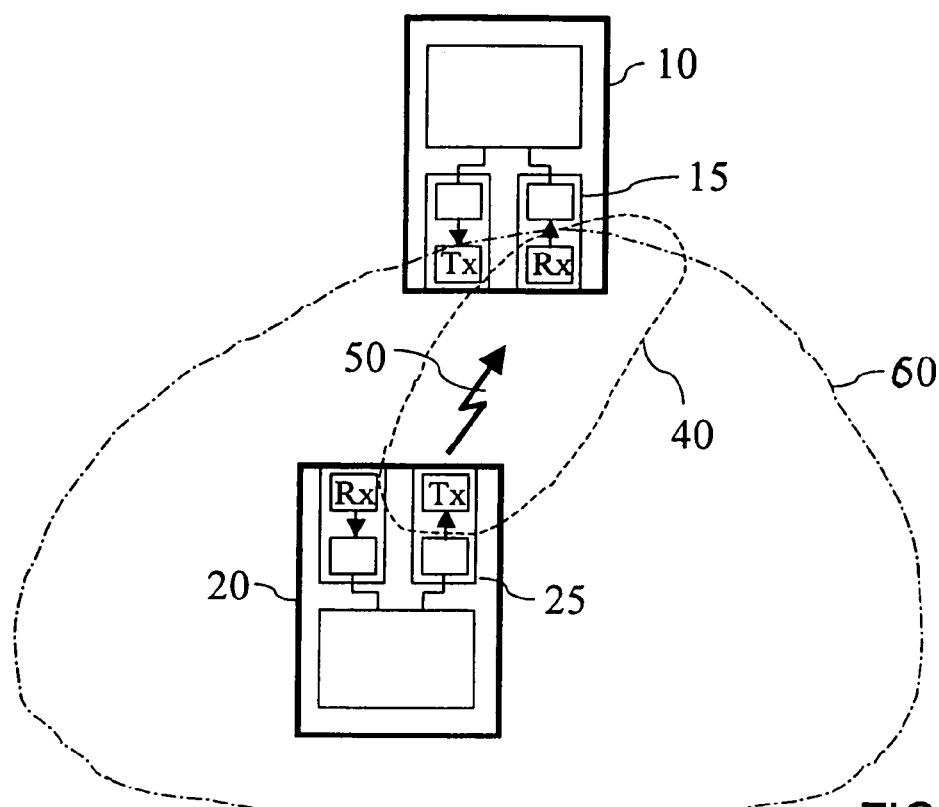
FIG. 3 shows schematically two elements of a wireless communication system according to an embodiment of the present invention.

FIG. 3 shows schematically two elements of a wireless communication system according to an embodiment of the present invention. The first element is a guest (20) having means for transmitting guest signals which include a guest transmitter (25). The guest transmitter (25) comprises a transmission element capable of transmitting signals of radio-frequency (RF) or of the infrared (IR) type or any other type. The second element is a host (10) having means for receiving guest signals which include a host receiver (15). The host receiver (15) comprises a reception element capable of receiving signals of the type transmitted by the guest.

When the guest (20) transmits a declaration signal (50) from within a declaration area (40) of the host (10), i.e. while the guest transmitter (25) is located within this declaration area (40), the host (10) establishes the link with the guest (20) upon reception of said declaration signal (50). Conversely, when the guest (20) transmits the declaration signal (50) from outside the declaration area (40) of the host (10), i.e. while the guest transmitter (25) is located outside this declaration area (40), the host (10) does not establish the link with the guest (20).

Figure 5:
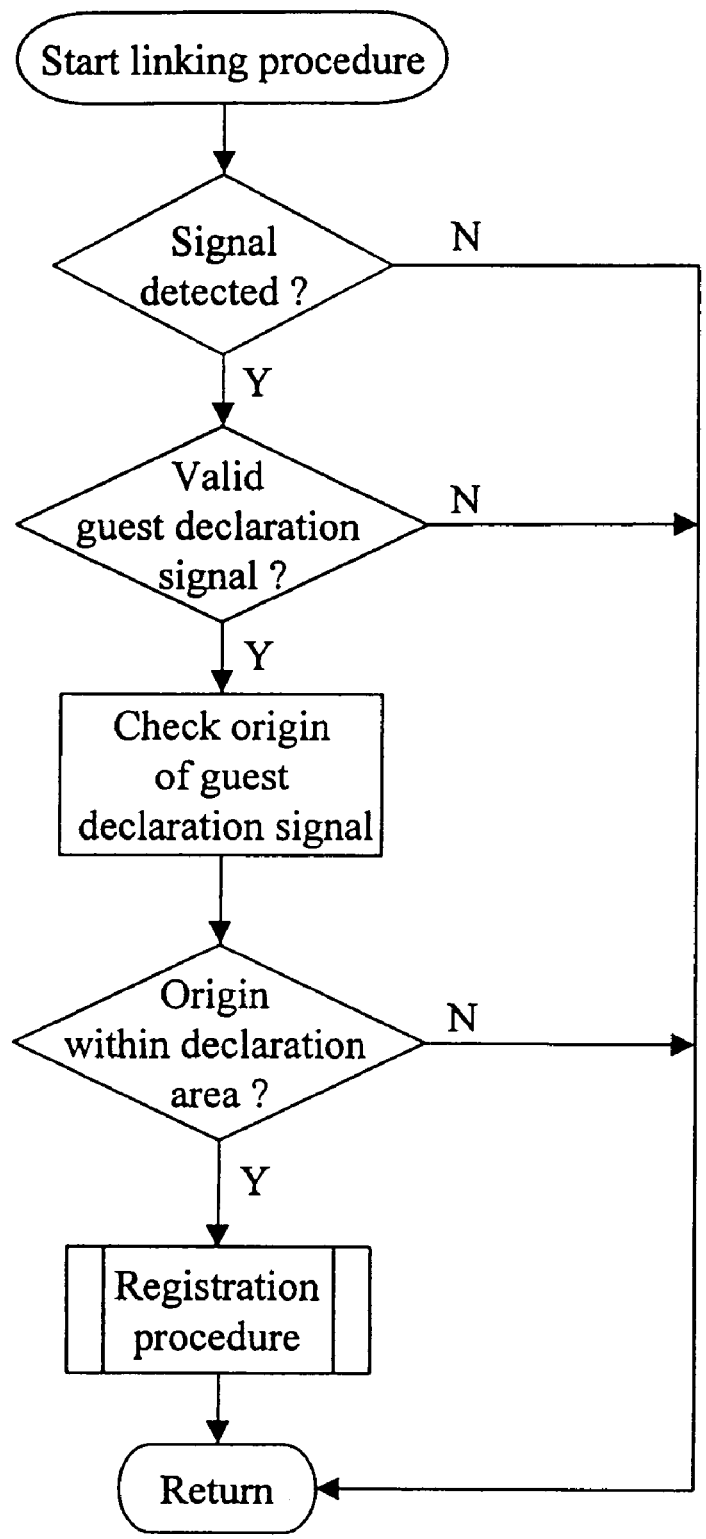
FIG. 5 shows a functional flowchart of an exemplary process implemented on a host of a wireless communication system according to an embodiment of the present invention.

Said declaration area (40) is an area which is substantially different from the normal operating area (60) of the guest/host pair, although it may partially be overlapped by the normal operating area (60) as shown in FIG. 3, or even be substantially overlapped by the normal operating area (60) as will be described below for a preferred embodiment as illustrated in FIG. 5.

One way to achieve such distinction is by means of a host (10) whose host receiver (15) comprises two distinct host receiver sensors, the characteristics and the position of a first sensor determining the declaration area (40) and the characteristics and the position of a second sensor determining the normal operating area (60).

In a system according to the invention, the user can thus establish a link between a selected guest and a selected host by simply bringing the selected guest's transmitter in the declaration area of the selected host and by triggering the transmission of the declaration signal from this position.

To trigger the transmission of the declaration signal (50), the user can, for example simply push a particular button or sensor on the guest (20); this further simplifies the process. Alternatively, a simple combination of buttons and/or sensors may also be used in order to reduce the risk of accidental triggering. Moreover, a direct action on the host (10) for establishing said link is superfluous. This aspect may constitute an additional advantage of the present invention, for example in case the host is out of reach of the user, or if, for aesthetic reasons, one does not wish to have buttons or any other means to trigger the request stage on the host.

Figure 4:
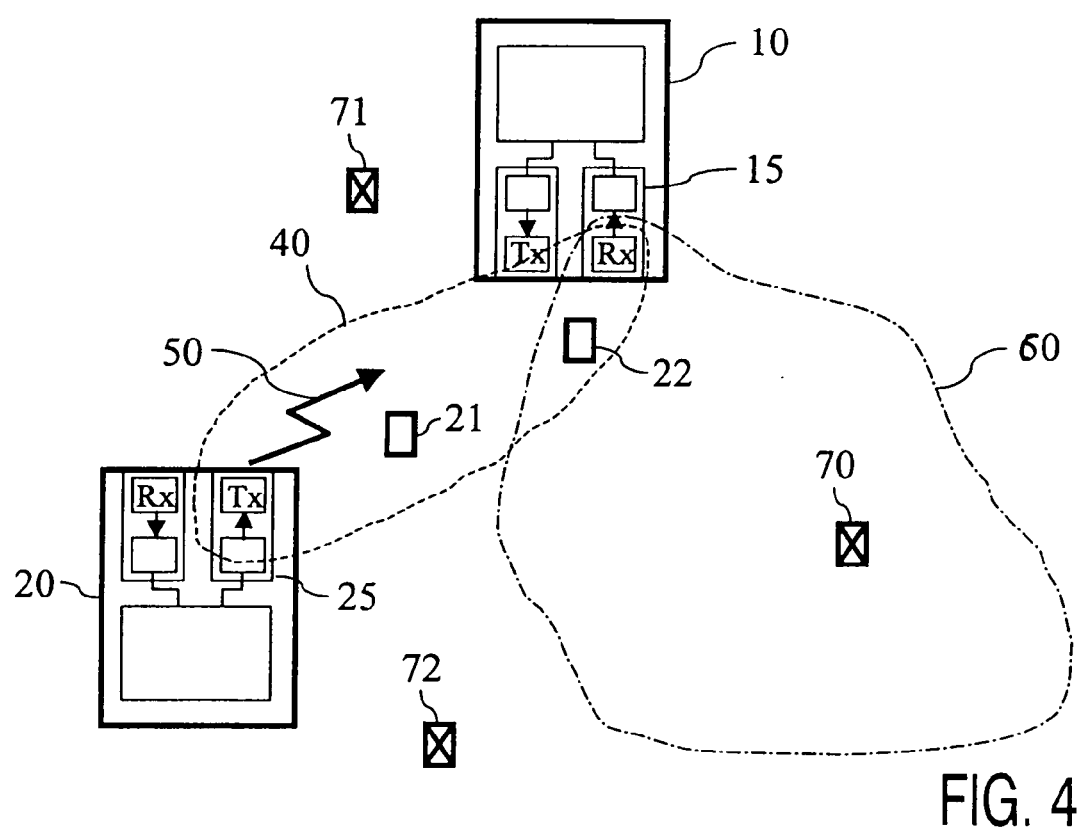
FIG. 4 shows schematically two elements of a wireless communication system according to a preferred embodiment of the present invention.

In FIG. 4 there are also indicated examples of other positions (21,22) of the guest transmitter (25) which will be treated by the system as being within the declaration area (40) and examples of further positions (70,71,72) of the guest transmitter (25) which will be treated by the system as being outside the declaration area (40).

In a preferred embodiment, the declaration area (40) of the host (10) extends around the host receiver (15) and is substantially smaller than and included in the normal operating area (60) of the guest transmitter (25)/host receiver (15) pair as shown schematically in FIG. 4. In such a configuration, a single host receiver sensor is sufficient for handling both the declaration signal (50) and the regular operation signals.

In order to avoid that the transmission of a declaration signal (50) within the declaration area (40) of one host (10) triggers the registration stage of another (unwanted) host, the declaration areas of the various hosts of the wireless communication system are preferably arranged so as to not overlap each other. To facilitate the fulfillment of this requirement, the host (10) of a system according to a most preferred embodiment of the invention has a declaration area (40) whose radius does not exceed 10% of the radius of the normal operating area (60) of the guest transmitter (25)/host receiver (15) pair, said radius being measured from the host receiver (15). This characteristic provides, moreover, for simple distinction between both areas, thereby further simplifying the required circuitry.

It is to be noted that the declaration areas and normal operating areas are represented in FIG. 3 and in FIG. 4 in a plane view for reasons of simplification, but that in reality these areas are three-dimensional areas.

In an embodiment of the system according to the invention, the guest (20) uses substantially the same transmission power for transmitting the declaration signal (50) and for transmitting the regular operation signals, all other things being equal of course (such as the state of charge of a host battery power supply). In such an embodiment, the host (10) determines the origin of the declaration signal (50) by measuring the signal strength of the received declaration signal (50). If said signal strength is greater than or equal to a first threshold, the host (10) concludes that the declaration signal (50) is being sent by the guest (20) from within his declaration area (40), i.e. while the guest transmitter (25) is located within his declaration area (40), and the host (10) consequently establishes the link with the guest (20). If said signal strength is smaller than or equal to a second threshold, the second threshold being substantially smaller than the first threshold, the host (10) concludes that the declaration signal (50) is being sent by the guest (20) from outside his declaration area (40), i.e. while the guest transmitter (25) is located outside his declaration area (40), and the host (10), consequently does not establish the link with the guest (20). An exemplary process implemented on the host (10) in such an embodiment is shown in FIG. 5.

In another embodiment of the system according to the invention, the guest (20) uses a first transmission power for transmitting the declaration signal (50) and a second transmission power for transmitting the regular operation signals, the first transmission power being substantially lower than the second transmission power, all other things being equal of course (such as the state of charge of a host battery power supply). Given that the host (10) generally requires a minimum signal/noise ratio for detecting a signal, the declaration area (40) in such other embodiment corresponds to the area in which the guest transmitter (25) has to be located while transmitting the declaration signal (50) so as to be received by the host (10) with a signal/noise ratio higher than said minimum, and the normal operating area (60) corresponds to the area in which the guest transmitter (25) has to be located while transmitting the regular operating signals so as to be received by the host (10) with a signal/noise ratio higher than said minimum.

The first transmission power being substantially lower than the second transmission power, the declaration area (40) will, consequently, be substantially smaller than the normal operating area (60).

In such other embodiment, the host (10) need not check the origin of the declaration signal (50). Indeed, if the host (10) receives a valid declaration signal (50), it inherently means that it is being sent from within his declaration area (40), and the host (10) will establish the link with the guest (20). If the guest (20) sends the declaration signal (50) from outside the host's declaration area (40), the host (10) will not detect the declaration signal (50) because its signal/noise ratio is lower than said minimum, and no link will be established with the guest (20).

Figure 6:
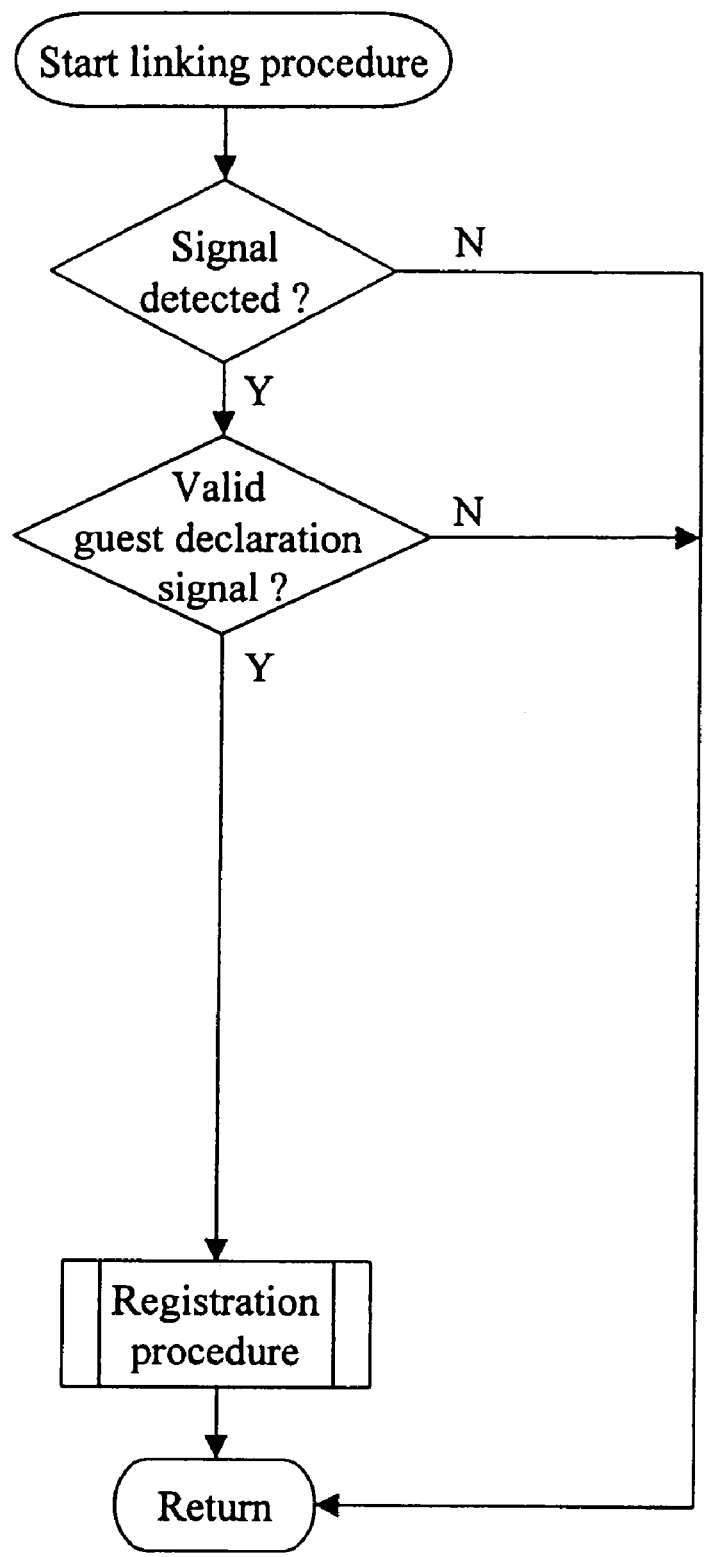
FIG. 6 shows a functional flowchart of an exemplary process implemented on a host of a wireless communication system according to another embodiment of the present invention.

The advantage of such other embodiment is that the host (10) basically does not need any particular means for determining the transmission origin of the declaration signal (50). An exemplary process implemented on the host (10) in such an embodiment is shown in FIG. 6. The disadvantage is that it requires a differentiation at the end of the guest (20) for sending signals of different power.

It is to be noted that in a system according to present invention, the host (10) need not transmit signals to the guest (20) for establishing a link with said guest. Therefore, in embodiments, the host (10) does not comprise a transmitter for intentionally transmitting signals to a guest (20). This simplifies the system and, consequently, reduces its cost. In preferred embodiments, the host (10) does not comprise a transmitter for intentionally transmitting signals.

Conversely, the guest (20) need not have a receiver for intentionally receiving signals from a host (10). In preferred embodiments, the guest (20) does not comprise a receiver for intentionally receiving signals.

In embodiments, it may be advantageous for the host (10) to comprise means for indicating to the user that the link is effectively established with the guest (20). Such indication may, for example, consist in temporarily switching on a light or emitting a sound. Such an indication means is particularly advantageous in case the host (10) does not comprise a transmitter and the guest (20) does not comprise a receiver, because in the case the host (10) has no possibility for indicating to the guest (20) that the link has been established with the guest (20) and hence the guest (20) has no possibility for indicating the same to the user.

In a multiple host environment, the guest (20) can be linked to a plurality of hosts simply by applying the linking procedure according to the invention with for of these hosts.

In a multiple guest environment, the host (10) can be linked to a plurality of guests simply by applying the linking procedure according to the invention for each of these guests.

In a multiple host/multiple guest environment, a guest (20) can be linked to a plurality of hosts and a host (10) can be linked to a plurality of guests in conformity with the two examples above.

The inventors have also found that the simplified selection and linking procedure according to the invention may advantageously be applied conversely to the system for a simplified unlinking of a selected guest (20) from a selected host (10) whereto the selected guest (20) was previously linked.

To achieve this, the system according to an embodiment of the invention comprises means for breaking up the link with the guest (20) upon reception by the host (10) of an unlinking signal transmitted by the guest (20) while the guest transmitter (25) is located within the declaration area (40) of the host (10), said means not breaking up the link with the guest (20) upon transmission of the unlinking signal by the guest (20) while the guest transmitter (25) is located outside said declaration area (40). Subsequent to breaking up the link, the host (10) will not respond to regular operation signals transmitted by the guest (20), as was the case prior to linking the host (10) with the guest (20), until any further linking.

In embodiments it may be advantageous that the host (10) comprises means for indicating to the user that the link to the guest (20) is effectively broken up. Such indication may, for example, consist in temporarily switching on a light or emitting a sound. Such an indication means is particularly advantageous in case the host (10) does not comprise a transmitter and the guest (20) does not comprise a receiver, because in that case the host (10) has no possibility for indicating to the guest (20) that the link with the guest has been broken up and hence the guest (20) has no possibility for indicating the same to the user.

In short the invention may be described as follows:

A system comprising at least one host and at least one guest communicating with each other via a wireless medium and having means for linking a selected host (10) to a selected guest (20). In order to be able to perform such selection and such linking in a simplified manner, the host (10) has means for establishing the link on the double condition that the guest (20) transmits a declaration signal (50) and that this declaration signal (50) is transmitted from within a declaration area (40) of the host (10), which declaration area differs substantially from the normal operating area (60) of the guest/host pair. The selection and the linking of the host (10) and the guest (20) is performed simply by putting the selected guest (20) in the declaration area (40) of the selected host (10) and by triggering the transmission of a declaration signal (50) by the selected guest (20) from within this declaration area (40).

The invention claimed is:

1. A wireless communication system comprising:
    at least one guest having means including a guest transmitter for transmitting guest signals; and
    at least one host having means including a host receiver for receiving the guest signals, said host comprising means for establishing a link with the guest upon reception of a declaration signal transmitted by the guest, after which the host will respond to regular operation signals transmitted by the linked guest, characterized in that:
    the means for establishing the link with the guest establishes the link upon reception by the host of the declaration signal transmitted by the guest while the guest transmitter is located within a declaration area of the host, said declaration area being an area different from a normal operating area of the guest/host pair, and said means not establishing the link with the guest upon transmission of the declaration signal by the guest while the guest transmitter is located outside said declaration area, the difference between the declaration area and the normal operating area being set on the basis of a parameter other than transmission power level, and the guest uses substantially the same transmission power for transmitting the declaration signal and for transmitting the regular operation signals.

2. The wireless communication system as claimed in claim 1, characterized in that the declaration area extends around the host receiver and is smaller than and is included in the normal operating area of the guest transmitter/host receiver pair.

3. The wireless communication system as claimed in claim 2, characterized in that the radius of the declaration area does not exceed 10% of the radius of the normal operating area of the guest transmitter/host receiver pair, the radius being measured from the host receiver.

4. The wireless communication system as claimed in claim 1, characterized in that the host does not comprise means for intentionally transmitting signals to the guest.

5. The wireless communication system as claimed in claim 4, characterized in that the host does not comprise means for intentionally transmitting signals.

6. The wireless communication system as claimed in claim 1, characterized in that the guest does not comprise means for intentionally receiving signals from the host.

7. The wireless communication system as claimed in claim 6, characterized in that the guest does not comprise means for intentionally receiving signals.

8. The wireless communication system as claimed in claim 1, characterized in that the host comprises means for indicating to a user that the link is effectively established with the guest.

9. The wireless communication system as claimed in claim 1, characterized in that the system comprises means for breaking up the link with the guest upon reception by the host of an unlinking signal transmitted by the guest while the guest transmitter is located within the declaration area of the host, said means not breaking up the link with the guest upon transmission of the guest unlinking signal by the guest while the guest transmitter is located outside said declaration area.

10. The wireless communication system as claimed in claim 9, characterized in that the host comprises means for indicating to a user that the link with the guest is effectively broken up.

11. The wireless communication system as claimed in claim 1, wherein said wireless communication system further comprises a first sensor for determining the declaration area and a second sensor for determining the normal operating area.

12. A host of a wireless communication system comprising at least one guest and at least one host, said guest having means including a guest transmitter for transmitting guest signals, said host having means including a host receiver for receiving the guest signals and means for establishing a link with the guest upon reception of a declaration signal transmitted by the guest, after which the host will respond to regular operation signals transmitted by the linked guest, characterized in that:
    the host comprises means for establishing the link with the guest upon reception of the declaration signal transmitted by the guest while the guest transmitter is located with in a declaration area of the host, said declaration area being an area different from a normal operating area of the guest/host pair, and said means not establishing the link with the guest upon transmission of the declaration signal by the guest while the guest transmitter is located outside said declaration area, the difference between the declaration area and the normal operating area being set on the basis of a parameter other than transmission power level, and the guest using substantially the same transmission power for transmitting the declaration signal and for transmitting the regular operation signals.

13. A method of establishing a link between a host having a host receiver and a guest having a quest transmitter of a wireless communication system comprising at least one host and at least one guest, after which the host will respond to regular operation signals transmitted by the linked guest, said method comprising the steps of:
    a) placing the guest transmitter within a declaration area of the host, said declaration area being different from a normal operating area of the guest transmitter/host receiver pair;
    b) performing a user action on the guest, whereupon the guest transmits a declaration signal; and
    c) establishing the link between the host and the guest if a transmission origin of the declaration signal is within the declaration area, and not establishing said link if the transmission origin is outside the declaration area, the difference between the declaration area and the normal operating area being set on the basis of a parameter other than transmission power level, the guest using substantially the same transmission power for transmitting the declaration signal and for transmitting the regular operation signals.

14. The method as claimed in claim 13, characterized in that the declaration area extends around the host receiver and is smaller than and is included in the normal operating area of the guest transmitter/host receiver pair.

15. The method as claimed in claim 14, characterized in that the volume of the declaration area does not exceed 10% of the volume of the normal operating area of the guest transmitter/host receiver pair.

* * * * *